April 18, 1961   J. B. OTTESTAD   2,979,938
ACTUATOR
Filed Oct. 19, 1956   5 Sheets-Sheet 1

INVENTOR.
JACK B. OTTESTAD
BY
ATTORNEY

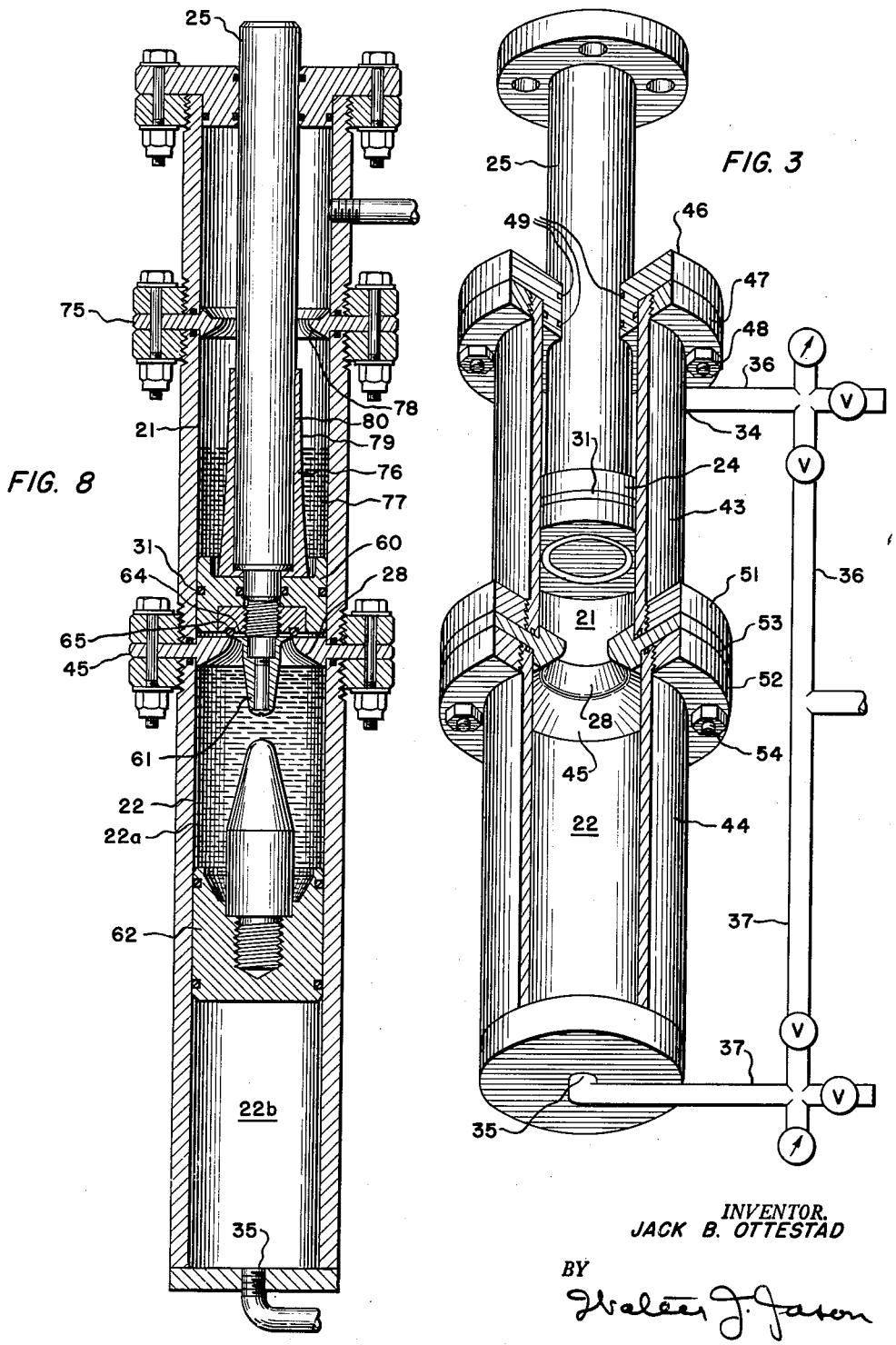

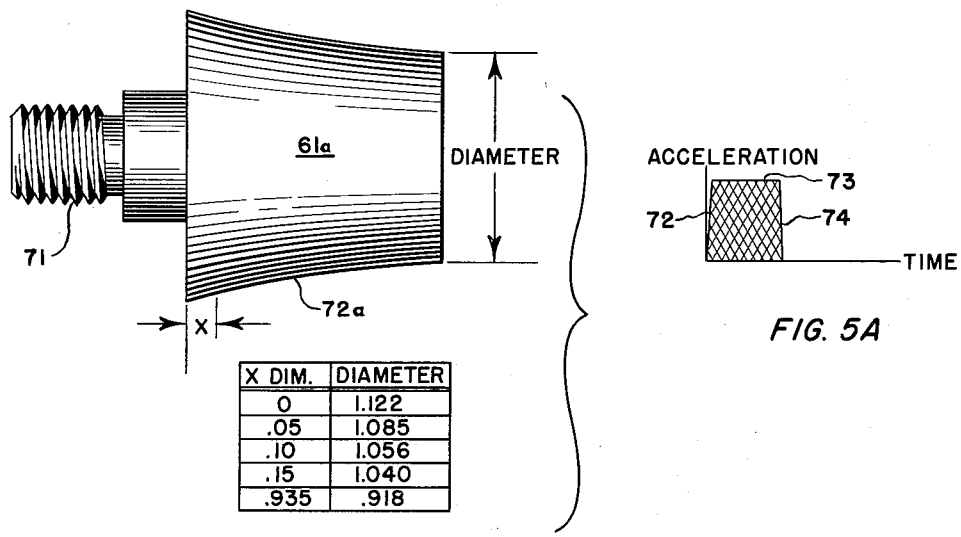
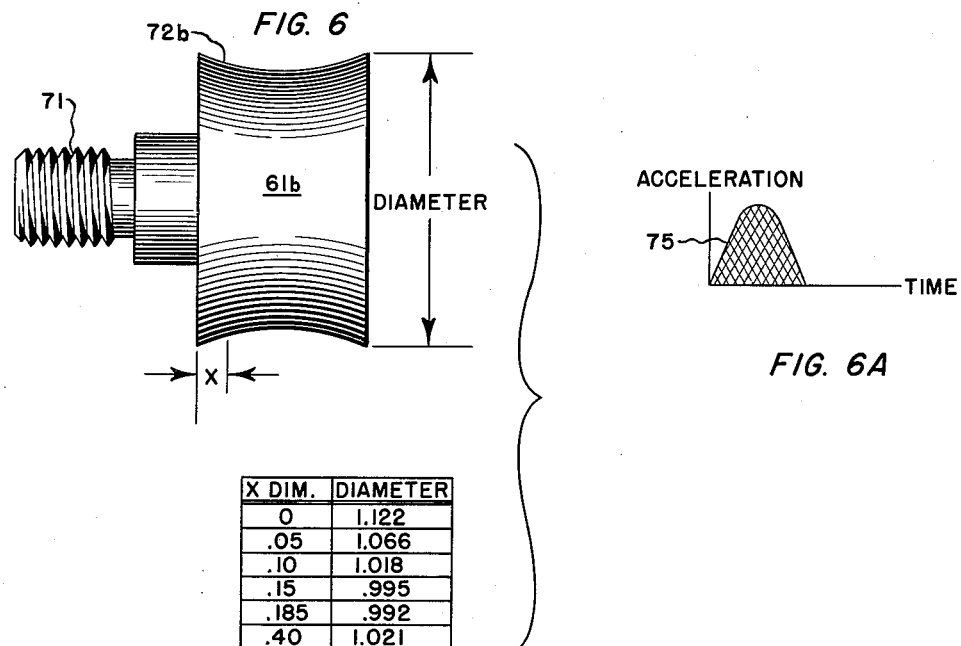

April 18, 1961  J. B. OTTESTAD  2,979,938
ACTUATOR
Filed Oct. 19, 1956  5 Sheets-Sheet 4
FIG. 7
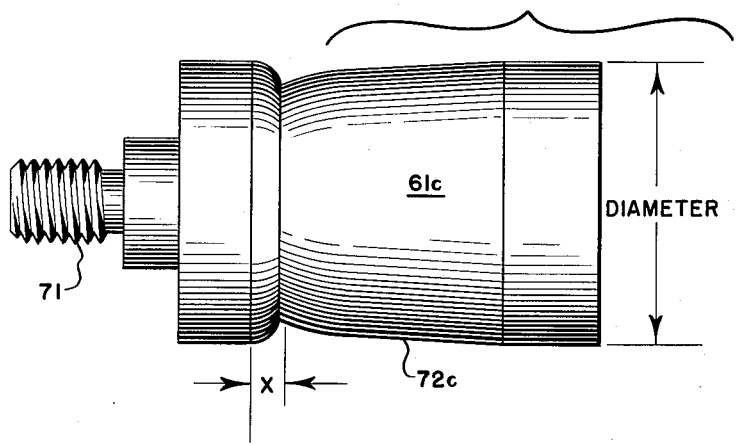
| X DIM. | DIAMETER |
|---|---|
| .0126 | 1.117 |
| .0410 | 1.094 |
| .0631 | 1.074 |
| .0914 | 1.042 |
| .1262 | 1.000 |
| .265 | 1.044 |
| .505 | 1.078 |
| .745 | 1.092 |
| .883 | 1.104 |
| .947 | 1.112 |
| .996 | 1.120 |
| 1.009 | 1.124 |
| 1.010 | 1.126 |
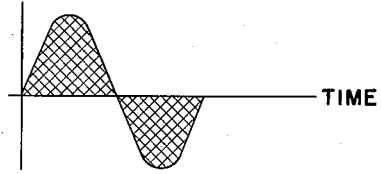
FIG. 7A
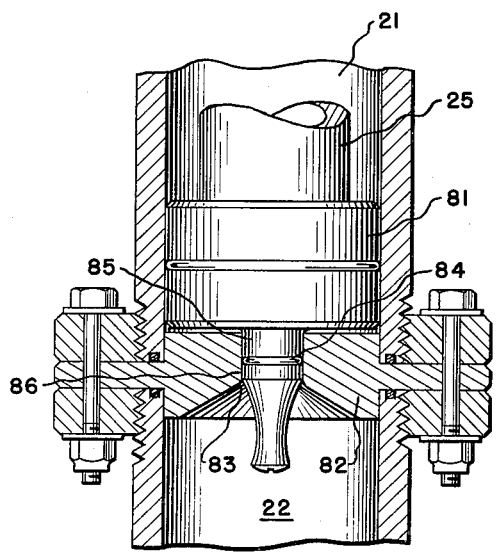
FIG. 9
INVENTOR.
JACK B. OTTESTAD
BY
ATTORNEY April 18, 1961  J. B. OTTESTAD  2,979,938
ACTUATOR Filed Oct. 19, 1956  5 Sheets-Sheet 5

INVENTOR.
JACK B. OTTESTAD
BY
ATTORNEY

United States Patent Office 2,979,938
Patented Apr. 18, 1961

2,979,938
ACTUATOR

Jack B. Ottestad, Claremont, Calif., assignor to General Dynamics Corporation, San Diego, Calif., a corporation of Delaware Filed Oct. 19, 1956, Ser. No. 617,014
29 Claims. (Cl. 73—12)

This invention relates in general to actuators and actuating apparatus for producing rapidly applied thrust loads, and in particular relates to actuators for producing controllable, rapidly applied thrust loads over appreciable displacement.

In regard to actuators or actuating apparatus, the general problem to be solved in most applications is the efficient storage and effective release of energy. The general problem becomes even more difficult where there is a requirement for the rapid release of this stored energy. Another facet of this same problem pertains to the control of the stored energy once it has been released.

Various devices and methods have been devised to solve the problem of the rapid release of stored energy. These devices include the use of shear pins, blowout diaphragms, rapid-acting valves, burning gases, explosives, etc. While each of these methods does provide means for the rapid release of stored energy, each has particular disadvantages and certain shortcomings that do not provide nor allow a complete nor adequate solution to the aforementioned problems. Although many shortcomings are apparent to those familiar with these prior art devices, typical of these shortcomings is the lack of accurate control over the initial value of the thrust developed, as well as the difficulty if not impossibility of precisely and accurately determining the time of activation. Furthermore, in the case of actuators utilizing rapid-acting valve mechanisms for triggering, the actual release of energy is inadequate for many applications because the thrust produced by the actuators builds up rather gradually and not rapidly. On the other hand, whereas blowout diaphragms or shear pin triggering mechanisms do produce a rapid release of energy, no accurate control of the energy level can be realized. Moreover, devices utilizing rapid-acting valves, blowout diaphragms or shear pins are expensive and demand elaborate installations and extensive maintenance.

Prior to the present invention, a problem of even greater concern was the absence of practical methods or means for controlling the thrust or acceleration-time pattern produced by actuators, regardless of how they were triggered. This problem is of great importance in many applications, and a variety of systems were developed in an attempt to provide control of the thrust-time pattern. The systems were either complex, expensive, unreliable and inaccurate, or a reversed approach was taken to solve the problem. For instance, in the shock-testing field, prior art systems for providing thrust or acceleration-time pattern control were all based upon the concept of rapid removal of energy as contrasted with a rapid release of energy. Typical examples of such systems are sand pits, collapsed lead blocks, stretched steel straps, hydraulic shocks, and so forth. Each of these systems has certain inherent deficiencies. For instance, total physical displacement is limited, repeatability in producing the same thrust-time pattern is inadequate, reliable variation or alteration in both the type and shape of thrust-time pattern is limited, the output thrust produced is limited, and the efficiency of each system is low when considering the amount of energy stored in relation to the amount of energy transmitted to the thrust-time pattern. Moreover, in such systems the original installation costs are high, operational and maintenance costs are also high and the equipment is generally large and bulky.

In the machine tool field actuators presently being used are also inadequate. They are generally large and bulky. Although capable of developing high output thrust loads, present actuators do not furnish high thrust loads without relatively long time delays after triggering. Furthermore, these present actuators generally can not be controlled with the desired degree of precision, and, in most instances, can not produce any range of thrust-time patterns for realizing optimum working conditions.

It is, therefore, an object of the present invention to provide an actuator or an actuating system for developing substantially instantaneous release of stored energy.

It is another object of the present invention to provide a unit that can control the high value of initial thrust developed.

It is another object of the present invention to provide a unit capable of sustaining high thrust over appreciable travel distances.

It is another object of the present invention to provide a unit that can produce a thrust or acceleration-time pattern which can be controlled.

It is another object of the present invention to provide an actuator or actuating system in which a low pressure can be rapidly amplified to a high pressure.

It is another object of the present invention to provide an actuator in which the triggering mechanism is an integral part.

It is another object of the present invention to provide actuators capable of producing a wide range of accelerations for controlled time durations.

A further object of the present invention is to provide an actuator or actuating system for producing predetermined patterns of acceleration and deceleration forces to a workpiece.

It is another object of the present invention to provide a unit capable of being connected in series with similar units for producing increased thrusts or pressures.

It is another object of the present invention to provide a unit capable of being connected in parallel with similar units for producing increased output thrusts.

It is another object of the present invention to provide simplified and improved apparatus for simulating shock, acceleration, and deceleration forces for environmental testing components, subassemblies or complete units.

Another object of the present invention is to provide simplified and improved apparatus for controlling or producing high impact or thrust forces for forming, fabricating or compounding end products.

It is a further object of the present invention to provide an improved actuator for use as a controllable power source for machine tool applications.

Other objects and features of the present invention will be readily apparent to those skilled in the art from the following specification and appended drawings.

For the purposes of this disclosure the following definitions appearing in the specification and claims will be applicable:

The terms "physical displacement" shall mean the actual displacement of the thrust column while producing a thrust.

The term "thrust" shall mean the force in pounds delivered by the thrust column, which may be directed against a test specimen, workpiece, or end product.

The term "thrust-time pattern" shall mean the variation in thrust as a function of time.

The term "acceleration" shall mean the positive rate of change of velocity.

The term "acceleration-time pattern" shall mean the variation in acceleration as a function of time.

The appended drawings illustrate certain preferred embodiments of the present invention in which:

Figure 3 is a vertical perspective view of an actuator embodying principles of the present invention.

Figure 5 illustrates a metering member for producing a substantially square wave acceleration-time pattern.

Figure 5a is a graphical representation of the acceleration-time pattern produced by an actuator utilizing the metering member shown in Figure 5.

Figure 6 illustrates a metering member for producing a substantially half sine wave acceleration-time pattern.

Figure 6a is a graphical representation of the acceleration-time pattern produced by an actuator utilizing the metering member shown in Figure 6.

Figure 7 illustrates a metering member for producing a substantially sine wave acceleration-time patern.

Figure 7a is a graphical representation of the acceleration-time pattern produced by an actuator utilizing the metering member shown in Figure 7.

Figure 8 is a vertical sectional view illustrating one embodiment of both acceleration and deceleration control of the output developed by an actuator.

Figure 9 is a partial sectional view of an actuator utilizing a modified embodiment of the triggering concept of the present invention.

Figure 1:
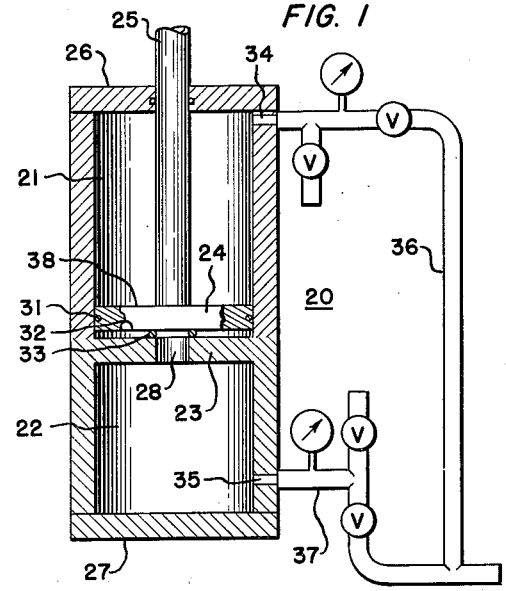
Figure 1 is a diagrammatic elevation of one embodiment of the present invention together with certain auxiliary control equipment.

Referring now to Figure 1 of the drawings there is represented an actuator capable of producing rapidly applied, high level output thrusts. This actuator comprises a cylinder denoted generally by the reference 20 which includes pressure chambers 21 and 22. As shown, chambers 21 and 22 are separated by a wall member 23. Slidably positioned within pressure chamber 21 is a piston 24 to which is connected a thrust column 25, which serves to transmit energy developed by the piston to a load member. Cylinder 20 is closed at one end by end portion 26 and at the other end by an end member 27. Thrust column 25 is arranged to extend through end portion 26 which carries a packing ring in a suitable groove to provide a pressure seal about the movable thrust column 25. The material utilized in forming cylinder 20, as well as end members 26 and 27, must be strong enough to withstand the loads produced by the working pressures in chambers 21 and 22. Cylinder 20 and end members 26 and 27 are preferably formed from metal such as steel, aluminum or the like. However, it has been found that these elements may be made of plastic material where the pressures utilized within chambers 21 and 22 are within the limits that the plastic elements can withstand.

Wall members 23 includes an aperture 28. Wall member 23 is fixedly supported within cylinder 20 by suitable means such as by brazing or welding, however, it is also contemplated that wall member 23 may be cast into the cylinder or otherwise included as an integral part of cylinder 20. Member 23 is fabricated of material capable of withstanding the loads produced by the pressure within chamber 22. It will be apparent to one skilled in the art that the shape of opening 28 in wall member 23 is preferably made to minimize the pressure drop thereacross and maximize its efficiency. The optimum shape can be obtained in readily available technical publications relating to the subject. The diameter of orifice 28, on the other hand, is directly related to the triggering and operating characteristics of the actuator and will be described in further detail hereinafter.

Piston 24 is fabricated from a material capable of withstanding any applied loads without buckling or rupturing and is arranged for translational movement within pressure chamber 21. Piston 24 must maintain at least a partial seal with respect to the inner wall of the cylinder. Accordingly, piston 24 carries a packing ring 31 within a groove on its peripheral surface. Surface 32 of piston 24 carries means in the form of a resilient element 33 for effecting a seal between the piston and orifice plate 23 when the actuator is in its static, or quiescent, condition. Element 33 preferably provides a positive seal which is maintained in the presence of incremental displacement of the piston. The sealing element 33 has a configuration and size closely approximating the opening 28 in wall member 23, and when in sealing relationship with orifice plate 23, serves to restrict the pressure established within chamber 22 to that area of the piston surface 32 exposed by the orifice.

In this embodiment of the invention a port 34 is provided in cylinder 20 and interconnects a source of pressure (not shown) with chamber 21 through a line 36. This source of pressure may be air, nitrogen, or other compressible gas. When a pressure P1 is applied within chamber 21, a resulting downward thrust is produced on the upper surface 38 of the piston which is equal to the pressure P1 times the area A1 of piston surface 38. This force causes the piston to move toward orifice plate 23 and the resilient seal 33 to be compressed around the periphery of the orifice opening 28 thereby establishing a seal between the piston and orifice plate. With the piston and orifice plate in sealing relationship, the undersurface 32 of piston 24 is isolated from chamber 22 except for the area exposed inside the seal 33.

Means for applying a force to the piston surface exposed by the orifice and seal is here provided in the form of pressure established in chamber 22 by a port 35 which is interconnected to a source of pressure (not shown) by a line 37. When a pressure P2 is applied to chamber 22 a resulting upward thrust is developed on the exposed area of the piston surface 32. This thrust is equal to the pressure P2 times the exposed area A2 of surface 32. Since the area A1 is larger than the area A2, the pressure P2 must be larger than pressure P1 in order to obtain a balanced thrust condition on piston 24. However, when piston 24 is in equilibrium, if pressure P2 is increased, an unbalanced thrust will be developed against piston surface 32 which will cause the piston to move. After the piston moves a small distance, the seal between orifice plate 23 and piston 24 is broken. With the seal broken, the pressure established in chamber 22, which exerts the force on surface 32, is no longer restricted to the small area exposed by the orifice 28; but rather reacts over the entire area of surface 32 thereby producing a very large unbalanced thrust against piston 24. The large net thrust acting on piston 24 causes the piston and its associated thrust column 25 to accelerate rapidly. For example, if the pressure P1 established within chamber 21 is 100 pounds per square inch and the area A1 of surface 38 is 10 square inches, the resultant downward thrust on the piston is 1000 pounds. Assuming that the area A2 exposed by the orifice 28 and seal 33 is one square inch then the piston will be placed in equilibrium when the pressure P2 established in chamber 22 is 1000 pounds per square inch. Now, if it is assumed that a net upward force of 100 pounds is required against piston surface 32 to break the seal, and the pressure in chamber 22 is raised from 1000 pounds per square inch to 1100 pounds per square inch, the seal will be broken. Assuming that the area of surface 32 is 10 square inches, when the seal is broken between orifice plate 23 and piston 24, the net upward force will be equal to 11,000 pounds minus the 1000 pounds acting on surface 38, thereby resulting in a 10,000 pound net upward thrust. If it is further assumed that piston 24, thrust column 25, and an external load member attached to thrust column 25 have a combined weight of 100 pounds, then from the equation $F=ma$ the acceleration imparted to this assembly will be 100 g's. However, if the combined weight of the foregoing elements were only 10 pounds then the acceleration would be 1000 g's. It, therefore, becomes apparent that the present invention provides load amplifying device whereby a small force can effectively control the activation or application of a very high force and it will further be apparent that an actuator embodying the principles of the present invention can produce extremely high accelerations from a moderate source of energy.

Although a positive seal is established when piston 24 and orifice member 23 are placed in sealing relationship, a small displacement of the piston will effectively disengage the seal and allow the high pressure in chamber 22 to react over a larger area of piston surface 32. Thus, when the triggering force is applied to piston 24 a very large thrust is transmitted substantially instantaneously to thrust column 25. As piston 24 moves in a direction away from orifice member 23, the gas in chamber 22 expands where the gas in chamber 21 is compressed. This results in a gradual reduction in the net output thrust from the 10,000 pounds utilized in the aforementioned example.

The back pressure developed against piston 38 by compression of the gas within chamber 21 has been found to serve effectively as a cushion between the end wall 26 and piston 24. Since this back pressure also reduces the output thrust delivered by the actuator, the output thrust may be maintained more nearly constant and still retain the cushioning effect by incorporating a relief valve in chamber 21 or the line to allow gas to escape when the pressure exceeds a predetermined value.

Subsequent activation of the device may be accomplished by simply releasing the pressure in chamber 22 by any suitable means and thereby allowing piston 24 to return to its starting position under the action of the pressure in chamber 21. As described hereinbefore the pressure in chamber 21 will exert a force on piston surface 38 which will position it in sealing relationship with respect to wall member 23.

Figure 2:
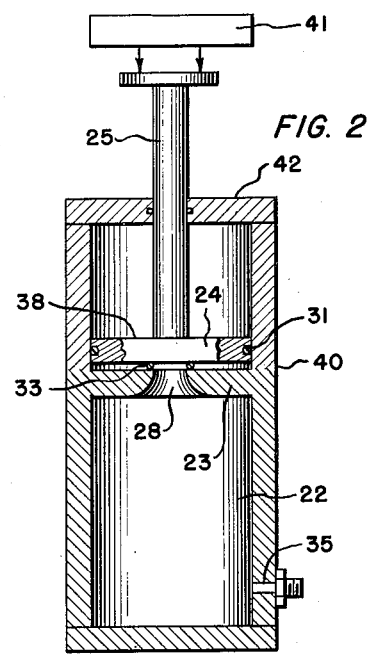
Figure 2 is a diagrammatic view of one embodiment of the present invention in which the unit is restrained in its quiescent condition through mechanical means.

Figure 2 is a modification of the exemplified embodiment illustrated in Figure 1. It may be seen that this modification is directed essentially to the means for applying a force to the piston to thereby establish it in sealed relationship with the apertured wall member. As shown, a cylinder 40 is included within which is provided chamber 22 similar to that shown in Figure 1. Wall member 23 with orifice 28, piston 24, thrust column 25 and sealing element 33 also may be similar to that described in Figure 1. Whereas in Figure 1 pneumatic pressure was utilized to produce the thrust on the upper surface 38 of piston 24 which caused the piston to be fixed in sealed position with respect to the orifice opening 28; in this embodiment mechanical means, indicated generally by the block 41, are utilized to provide the force to close the orifice opening and establish the seal between wall member 23 and piston 24. As indicated by the arrows associated with the block 41, the mechanical restoring force may be applied to the thrust column 25 and is preferably applied in a direction to move the piston 24 toward orifice plate 23. The particular mechanical means 41 utilized to produce this force is not intended to form a part of the present invention. It is contemplated that the mechanical means for developing the restoring force may be provided by another actuator similar to the one herein described, by a small hydraulic or pneumatic press, by a simple mechanical linkage, or other mechanism capable of producing the required force. It is contemplated that the force required to position piston 24 and wall member 23 in sealed relationship may be afforded by the weight of the load member to which the thrust developed by the actuator is applied, together with the weight of the piston and thrust column. Cylinder 40 could be similar to cylinder 20 shown in Figure 1 and the device would function substantially the same. However, in contrast with the actuator of Figure 1, the volume within cylinder 40 and above upper surface 38 of the piston need not withstand external applied pressure since the piston 24 and orifice plate 23 are established in sealing relationship by forces developed by mechanical means 41. Hence, it will be apparent that end member 42 of cylinder 40 could be eliminated thereby allowing the cylinder to remain open. This would not materially alter the operation of the device.

In operation, mechanism 41 produces a downward thrust on the piston 24, which for purposes of illustration may be assumed to be equal to 1000 pounds, and sufficient to place the piston and orifice plate 23 in sealed relationship. Hence, only that area of surface 32 defined by the orifice opening 28 would be exposed to pressure developed in chamber 22. Chamber 22 may be pressurized from an external source (not shown) through the port 35. Assuming that the orifice 28 is similar to that described in connection with Figure 1 and has an effective area of one square inch, the pressure established in chamber 22 can be 1000 pounds per square inch and thus established a balanced thrust condition on piston 24. As mentioned hereinbefore, increasing the pressure in chamber 22 above the equilibrium level creates an unbalanced force against surface 32 resulting in movement of the piston. This movement serves to break the seal and allows the pressure in chamber 22 to react over the entire area of surface 32 thereby producing a high unbalanced thrust substantially instantaneously. As described in connection with Figure 1, packing ring 31 is carried on the peripheral surface of piston 24 and provides a pressure seal between the interior wall of cylinder 40 and the piston. Thus, as piston 24 moves away from orifice plate 23 under the action of the high unbalanced upward force, this force continues to exert a large upward thrust on the piston and associated thrust column 25. For subsequent activation of the unit the pressure in chamber 22 is released which allows piston 24 to return to the static position under the action of the force produced by the mechanism 41.

Whereas the actuators of Figures 1 and 2 may be constructed from a single cylinder, the embodiment illustrated in Figure 3 is fabricated from a pair of cylinders 43 and 44, which form the chambers 21 and 22 respectively. Cylinders 43 and 44 may have different volumes but must be strong enough to withstand the loads produced by the pressures established in chambers 21 and 22 and are preferably formed from metal such as steel, aluminum, or the like. However, they may be formed from other material, such as plastic, where the working pressures are appropriately limited.

As in Figures 1 and 2, chambers 21 and 22 are separated by an apertured orifice plate 45, and slidably positioned within chamber 21 is thrust piston 24 to which is connected thrust column 25. Chamber 21 is closed at one end by a member 46 which has an opening therein through which thrust column 25 may extend. As shown, end member 46 has a shape corresponding to the shape of wall member 43 and is chosen to have an L-shaped sectional configuration. One portion of member 46 is arranged to fit within the inner wall of chamber 21 and provide an opening to accommodate the thrust column. Associated with member 46 is an annular ring 47, the internal surface of which is threaded or otherwise secured to the external surface of wall member 43. Suitable attachment means such as bolts 48 are provided for securing member 46 to wall portion 43 and providing means for removing member 46 and allowing piston 24 to be removed. Packing rings 49 are inserted in appropriate grooves in member 46 and serve to provide a seal around the movable thrust column 25.

As in previous embodiments, chambers 21 and 22 are partitioned by an orifice plate 45 having an aperture 28 therein as described hereinbefore. In this embodiment orifice plate 45 is supported within the actuator but is readily removable. For purposes of attachment, orifice plate 45 includes a flange portion 53 arranged to be interposed and supported between chamber wall members 43 and 44. To facilitate assembly and support of the orifice plate, a pair of annular members 51 and 52 are provided and are adapted to be threadably engaged with cylinders 43 and 44. With members 51 and 52 threaded on wall members 43 and 44 and flange 53 interposed therebetween, bolts 54 serve to align the chambers 21 and 22 and support orifice plate 45.

With chamber 22 suitably sealed and means provided for establishing the desired pressures in chambers 21 and 22 the function and operation of the actuator will be similar to that described hereinbefore. However, the structure described and illustrated in Figure 3 provides an actuator that can be quickly and inexpensively fabricated and assembled. Moreover, the actuator described in this embodiment facilitates maintenance and allows interchangeability of different parts to provide actuators having various characteristics. It will be apparent that orifice plate 45 may be readily replaced by another plate having a different size opening therein or the capacity of the chambers can be altered.

Figure 4:
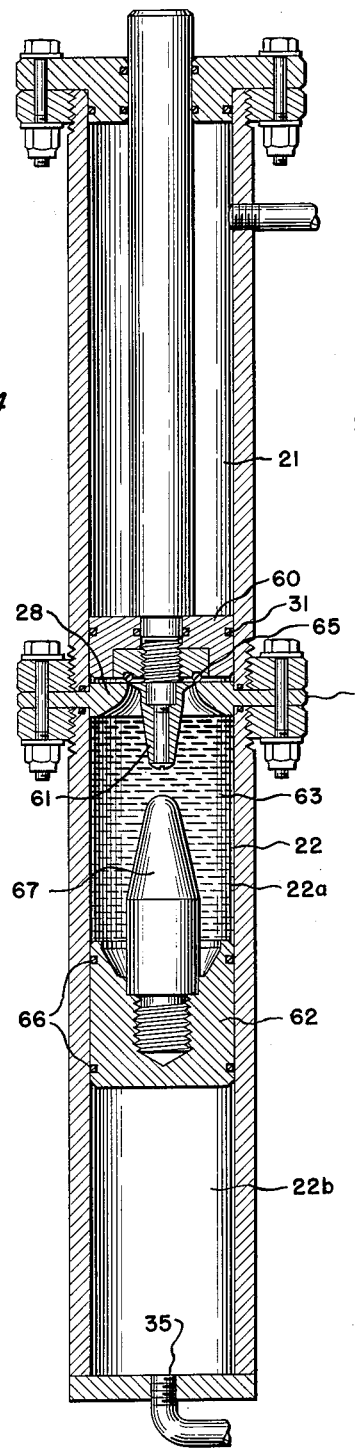
Figure 4 is a vertical sectional view of the present invention illustrating one embodiment of acceleration control of the thrust column.

Figure 4 illustrates an embodiment of the present invention having means for controlling the output acceleration or thrust whereby predetermined acceleration or thrust-time patterns may be produced. As shown, the actuator includes chambers 21 and 22 separated by orifice plate 45 with chamber 22 being divided into chambers 22a and 22b by a piston 62. Control fluid 63 is placed in chamber 22a and pressure in the form of compressed gas is established in chamber 22b through port 35. Associated with orifice 28 of wall member 45 is a metering member 61 which serves to regulate the flow of control fluid through the orifice. Triggering of the actuator is similar to the units hereinbefore described, however, upon actuation the control fluid must flow through the opening of orifice 28 as modified by member 61 in order to exert the desired force against the undersurface of thrust piston 60, which is slidably positioned in chamber 21. Piston 60 has a diameter slightly smaller than the diameter of the inner wall of chamber 21, and since a pressure seal is desirable between thrust piston 60 and the inner wall, packing ring 31 is carried in an appropriate groove in the peripheral surface of piston 60.

Resilient means for effecting a seal between piston 60 and orifice plate 45 when the actuator is in its quiescent condition is provided in the form of a resilient element 65 surrounding regulating element 61. Element 65 preferably provides a positive seal between wall member 45 and piston 60 which is maintained in the presence of incremental displacement of the piston. Sealing element 65 may be rubber or other resilient material with a configuration and size approximating the opening 28 of orifice plate 45 so that when the sealing relationship is established, element 65 serves to restrict the pressurized control fluid established in chamber 22a to that area of the piston exposed by the orifice 28 and seal.

Piston 62, which separates chamber 22 into chambers 22a and 22b, is slidably positioned within chamber 22 and carries packing rings 66 engaging the inner wall of the chamber to provide a pressure seal therebetween. Piston 62 serves to separate the compressed gas in chamber 22b from the control fluid 63 in chamber 22a and maintain the pressure on the control fluid as the fluid is forced through the orifice. In addition to maintaining the pressure on the control fluid and limiting the forces acting on the undersurface of piston 60 to the forces supplied through the control fluid piston 62 includes an element 67 arranged to engage orifice opening 28 and serves to terminate the forces applied to piston 60 by closing or blocking aperture 28. Element 67 also serves to provide a shock free stop for piston 62. Otherwise, the pressure in chamber 22b would cause piston 62 to be driven hard against orifice plate 45.

With suitable pressure established in chamber 21 thereby setting piston 60 and orifice plate 45 in the sealed position and with control fluid in chamber 22a, pressure may be applied to chamber 22b. The pressure in chamber 22b through the control fluid column exerts a force on piston 60 that is opposed to the force applied by the pressure in chamber 21. When the force generated by the control fluid against piston 60 exceeds the force maintaining the piston and orifice plate 45 in sealed relationship, the resultant force causes relative movement of piston 60 and plate 45 whereupon the seal is broken. In the embodiments heretofore described, when the seal was broken, pressure in the lower chamber was allowed to immediately react over the entire undersurface of the piston. In the embodiment illustrated in Figure 4, however, the accelerating force exerted against piston 60 is provided through the control fluid in chamber 22a, and in order to react against the increased piston area after the seal is broken, the control fluid must flow through the opening of orifice 28 as modified by regulating member 61.

The forces developed upon piston 62 are, of course, a function of the pressures in chambers 21 and 22a, the size and mass of piston 62, etc., but are also a function of the size and configuration of aperture 28, the size and configuration of regulating member 61, and the fluid characteristics of control fluid 63. The type of control fluid forms no part of the present invention; any number of fluids will be satisfactory. Standard aircraft hydraulic fluid (MIL-S-5606) has been used very effectively.

The net pressure acting on the undersurface of piston 60 is not necessarily equal to the pressure applied to the control fluid by piston 62. The pressure acting on piston 60 is dependent upon the flow area of the orifice 28 since a pressure drop, which is a function of the orifice area, is created by the restriction of the orifice. Hence, by regulating the flow area of orifice 28, the force acting on piston 60 may be controlled. In the present invention the flow area of the orifice is controlled by the selective positioning of the contoured metering member 61 relative to the orifice. As will be illustrated in detail hereinafter, the cross-sectional area of regulating member 61 is different at various locations along its longitudinal axis. In the exemplified embodiment of the invention illustrated in Figure 4, metering member 61 is carried by and moved with thrust piston 60. Hence, the flow area of the orifice can be varied in accordance with the position of piston 60 and thereby produce a predetermined variable force on the piston. This in turn will provide a variation in acceleration of the piston and the attached thrust column 25. Thus, it may be seen that desired acceleration or thrust-time patterns are produced by the actuator by providing appropriately contoured metering elements functioning with other essential elements described hereinbefore.

Referring now to Figures 5, 6, and 7 metering members 61a, 61b, and 61c are shown. These metering members can be utilized with thrust piston 60 in Figure 4 to produce the acceleration-time relationships illustrated in Figures 5a, 6a, and 7a, respectively. The regulating member when carried by piston 60 may be formed as an integral part of the piston or may be made as a separate part and physically attached to the piston. Members 61a, 61b, and 61c may be constructed of any material capable of withstanding the pressure created within the unit and the shock loads produced and must also be capable of withstanding the frictional forces produced by the high velocity control fluid. Metering members made of brass or aluminum have been very satisfactory. Each member includes a threaded portion 71 adapted to be engaged with a suitably tapped hole in the undersurface of thrust piston 60. As mentioned hereinbefore, the metering members have surfaces such as 72a, 72b, 72c with variable cross-sectional dimensions which are selected in accordance with the output characteristics desired to be produced by the actuator in which they are utilized. Since the metering member operates within the opening 28 of orifice plate 45, the maximum diameter of the portion of surfaces 71a, 71b, and 71c that provides regulation is limited by the diameter of opening 28. The contour of the regulating members cannot be clearly shown by the drawings, hence accompanying Figures 5, 6 and 7 are typical numerical representations of the diameter of the members as a function of their length. Figure 5 shows a metering member, when incorporated in a suitable actuator, that produces the acceleration-time waveform illustrated in Figure 5a. It will be noted in Figure 5a that the acceleration increases from zero very rapidly in the region indicated by reference numeral 72, remains substantially constant in the region indicated by numeral 73, and then decreases very rapidly as shown by numeral 74. The greater the rate of change of acceleration the more nearly vertical will be the portions 72 and 74 of the waveform and the closer the waveform will simulate a rectangle. Although portions 72 and 74 cannot be absolutely vertical, it has been found that substantially vertical accelerations can be produced. A square acceleration-time pattern is merely a special case of the rectangular waveform where the acceleration level is equal to the time the acceleration remains constant.

Figure 6 shows a metering member having a contour for producing the half-sine wave acceleration-time pattern shown in Figure 6a on a thrust piston with which it is associated. As in the case of the metering member illustrated in Figure 5, the contour cannot be shown too clearly. Therefore, numerical representations of the diameter of the member at the indicated points along its length are shown in the accompanying chart. Although the waveform is described as a half-sine wave, it will be noticed that the increasing acceleration portion 75 of the waveform can be made quite linear and approximates one portion of a triangular waveform.

Figure 7 shows a metering member having a contour for producing a full sine wave pattern as illustrated in Figure 7a. Construction of a metering member in accordance with the present invention can be effected by knowing the mass M of the test specimen or workpiece against which the thrust column 25 operates and the acceleration-time pattern that is desired to be developed on this mass. For purposes of illustration the acceleration-time pattern shown in Figure 7a will be used. From this, the force required at any given time, the velocity of mass M at any given time, and the displacement of mass M at any given time can be readily established.

Having established the force, velocity, and displacement of mass M as a function of time, the following symbols relating to Figure 4 will be utilized in illustrating how the shape of the metering member may be determined:

$A_{mp}$=area of metering member 61 (in.$^2$)
$A_0$=area of orifice 28 (in.$^2$)
$A_1$=area of chamber 22b (in.$^2$)
$A_2$=area of load piston 62 (in.$^2$)
$A_3$=undersurface area of thrust piston 60 (in.$^2$)
$A_4$=top surface area of thrust piston 60 (in.$^2$)
$L_1$=length of chamber 22b (in.)
$L_4$=length of chamber 21 above piston 60 (in.)
$x$=displacement of thrust column 25 relative to the quiescent position (in.)
$\dot{x}_3$=velocity of thrust column 25 (in./sec.)
$\ddot{x}$=acceleration to be imparted to total mass (in./sec.$^2$)
$g$=acceleration due to gravity (386 in./sec.$^2$)
$P_{40}$=set pressure to establish piston 60 and orifice plate 45 in quiescent condition (p.s.i.)
$P_{10}$=initial pressure at which the unit is actuated (p.s.i.)
$d_0$=density of the control fluid (lb./in.$^3$)
$t$=time (sec.)

Having established the force, velocity, and displacement of mass M as a function of time, the possible acceleration $\ddot{x}$ which may be imparted to a given mass M is expressed as:

(1.1) $\ddot{x}$=F/M where F is the required force.
(1.2) The force is provided by the summation of $$P_3(A_3-A_{mp})+P_2A_{mp}-P_4A_4$$

or $$F=P_3(A_3-A_{mp})+P_2A_{mp}-P_4A_4$$

(1.3) Since the required force and the output force must be equal, Equations 1.1 and 1.2 may be equated.

$$F=F=M\ddot{x}=P_3(A_3-A_{mp})+P_2A_{mp}-P_4A_4$$

(1.4) Flow through the orifice is defined as $Q=AV$ where A is the flow area $(A_0-A_{mp})$
and $$V=\sqrt{2gh} \text{ and } h=\frac{\Delta P}{d_0}$$

Such that $$Q=(A_0-A_{mp})\sqrt{2g\frac{\Delta P}{d_0}}$$

(1.5) The actual physical flow through the orifice may be written $$Q=(A_3-A_{mp})\dot{x}$$

(1.6) In that the defined flow and the actual flow are equal, 1.4 and 1.5 may be combined, hence $$Q=Q=(A_0-A_{mp})\sqrt{2g\frac{\Delta P}{d_0}}=(A_3-A_{mp})\dot{x}$$

(1.7) By transposing 1.6, $A_{mp}$ may be written $$A_{mp}=A_0-\frac{(A_3-A_{mp})\dot{x}}{\sqrt{2g\frac{\Delta P}{d_0}}}$$

since $2g$ and $d_0$ are constants, $$A_{mp}=A_0-\frac{(A_3-A_{mp})\dot{x}}{\sqrt{\frac{2g}{d_0}}\sqrt{\Delta P}}$$

(1.8) $P_2$ is reduced by P in passing through the orifice such that $$P_3=P_2-\Delta P$$

(1.9) Further, using 1.3

$$P_3=\frac{M\ddot{x}+P_4A_4-P_2A_{mp}}{(A_3-A_{mp})}$$

(2.0) Combining 1.8 and 1.9

$$P_2-P=\frac{M\ddot{x}+P_4A_4-P_2A_{mp}}{(A_3-A_{mp})}$$

$$\Delta P=P_2-\frac{M\ddot{x}+P_4A_4-P_2A_{mp}}{(A_3-A_{mp})}$$

(2.1) Substituting P from 2.0 into 1.7

$$A_{mp} = A_0 - \frac{(A_3 - A_{mp})^{1.5}\dot{x}}{\sqrt{\frac{2g}{d_0}}\sqrt{P_2 A_3 - P_4 A_4 - M\ddot{x}}}$$

Which is the basic relation for calculating the required metering pin area at any point of displacement.

(2.2) The general expression for $P_2$ at any point of displacement is determined as follows:

Due to the adiabatic reaction of gas in $V_1$ it can be said that $P_1 V^{.4} = C_1$, where $P_1$ is the pressure established in chamber $22b$, $V_1$ is the volume of chamber $22b$, and $C_1$ is a constant; the gases are considered to react adiabatically in that it is improbable that any heat transfer takes place in the infinitesimal time interval involved. Also $P_2 = P_1$ (neglecting friction) such that $$P_2 V_1^{1.4} = C_1$$

Where, for the initial conditions $$P_{10} V_{10}^{1.4} = C_1 = P_{10}(A_1 L_1)^{1.4}$$

also $$C_1 = P_{2x} V_{1x}^{1.4} = P_{2x}[A_1 L_1 + A_2 x]^{1.4}$$

from $C_1 = C_1$ $$P_{10}(A_1 L_1)^{1.4} = P_{2x}[A_1 L_1 + A_2 x]^{1.4}$$

and $$P_{2x} = P_{10}\left[\frac{A_1 L_1}{A_1 L_1 + A_2 x}\right]^{1.4}$$

(2.3) $P_{4x}$ is established in a similar manner.

$$P_4 V_4^{1.4} = C_4$$
$$C_4 = P_{40}[A_4 L_4 + A_5 L_5]^{1.4}$$
$$C_4 = P_{4x}[A_4(L_4 - x) + A_5 L_5]^{1.4}$$

$$P_{4x} = P_{40}\left[\frac{A_4 L_4 + A_5 L_5}{A_4(L_4 - x) + A_5 L_5}\right]^{1.4}$$

(2.4) Displacement $x$, velocity $\dot{x}$ and acceleration $\ddot{x}$ may be related from the equations of motion, namely:

$$\ddot{x} = f(t)$$
$$\dot{x} = \int f(t)dt$$
$$x = \iint f(t)dt\,dt$$

(2.5) By applying the relationships of equations 2.2, 2.3 and 2.4 to 2.1, $A_{mp}$ may be established for a number of displacements to produce the metering pin contour, namely $$A_{mp} = A_0 - \frac{(A_3 - A_{mp})^{1.5}\dot{x}}{\sqrt{\frac{2g}{d_0}}\sqrt{A_3 P_{10}\left[\frac{A_1 L_1}{A_1 L_1 + A_2 x}\right]^{1.4} - A_4 P_{40}\left[\frac{A_4 L_4 + A_5 L_5}{A_4(L_4 - x) + A_5 L_5}\right]^{1.4} - M\ddot{x}}}$$

Now assuming that the sine wave acceleration-time pattern illustrated in Figure 7a is to be imparted to a 600 pound test specimen or workpiece by the actuator for a time duration of 32 milliseconds and at a maximum acceleration level of 16 g's and the weight of piston 60 and thrust column 25 is 10 pounds, the following conditions are also assumed:

$A_0 = .995$ in.$^2$
$A_1 = A_2$
$A_3 = 7.05$ in.$^2$
$A_4 = 6.28$ in.$^2$
$L_1 = 2.0$
$L_4 = 2.0$
$P_{10} = 1915$ p.s.i.a.
$P_{40} = 360$ p.s.i.a.

$$\frac{2g}{d_0} = 159$$

Then, $$M\ddot{x} = \frac{600 + 10}{g}(16g \sin wt.)$$
$$= 9760 \sin 11{,}250t$$

and $$x = 31.55\left(t - \frac{\sin 11{,}250t}{196.5}\right)$$

Since the full exact solution of Equation 2.5 involves three basic roots and since the presentation of said full exact solution becomes extremely long and complex, an approximate solution for the above conditions is presented below by assigning a value to $A_{mp}$ on the right hand side of Equation 2.5. This solution provides metering pin dimensions that are correct within normal manufacturing tolerances.

The above mentioned approximate solution would be as follows:

Assuming, $A_{mp} = .9$ in.$^2$ (on right hand side of Equation 2.5)

And substituting the given values as listed above

Then $$A_{mp} = .995 - \frac{(7.05 - .9)^{1.5}(31.55)(1 - \cos 11{,}250t)}{159\sqrt{7.05(1915)\left[\frac{1}{1+\frac{x}{2}}\right]^{1.4} - 6.28(360)\left[\frac{1}{1-\frac{x}{2}}\right]^{1.4} - 9760 \sin 11{,}250t}}$$

Solving $A_{mp}$ for various values of $x$ as a function of time $t$ a tabulation of metering pin diameters versus displacements $x$ can be developed, as shown in Figure 7.

By utilizing the regulating members illustrated in Figures 5, 6, and 7 rectangular as well as sine waveforms of acceleration versus time can be generated by the actuators of the present invention, and it will be clear that other desired acceleration or thrust waveforms can be developed at thrust column 25 by providing appropriate contours on regulating member 61 in accordance with the foregoing description. It will also be apparent that different acceleration-time patterns can be conveniently produced by a single actuator by simply substituting different regulating members.

During actuation of the unit the volume of chamber $22b$ will increase and thereby produce a decrease in pressure acting on piston 62 and the control fluid column between thrust piston 60 and piston 62. Although chambers $22a$ and $22b$ are shown in the drawings to have comparable volume, if it is desired to maintain the pressure on the fluid column substantially constant, the volume of chamber 22b can be made large with respect to chamber 22a and thereby minimize pressure changes during actuation. It will also be noted that during the actuation portion of the cycle, the volume of chamber 21 above thrust piston 60 will decrease which in turn will produce an increase in pressure which acts as a back pressure against the top surface of thrust piston 60. Where it is found desirable to maintain the back pressure in chamber 21 substantially constant or at some predetermined level this can be readily accomplished by appropriately choosing the volume of chamber 21 above the thrust piston 60 so that the volumetric change during actuation is not appreciably altered.

Where a higher or lower acceleration level is desired on a given specimen or workpiece with the same general waveform, a higher or lower force can be exerted on the thrust piston. This can be realized by increasing or decreasing the pressure exerted on piston 60. However, by changing the pressure to produce different acceleration levels, the time duration of the acceleration wave form will be slightly modified. This is so because the time duration is determined by the velocity at which the control fluid flows through the area or orifice 28 as modified by the metering element and reacts on piston 60. Thus, the net pressure acting on the control fluid to force it through the orifice has a direct effect on the output thrust level and also has an effect on the time duration of the acceleration wave form although the variation in time duration will be very slight and probably be unnoticeable.

The length of the control fluid column, that is the height of the control fluid above load piston 62, has a direct effect upon the time duration of the waveform. For example, with the actuator in its quiescent position as shown in Figure 4 and a given pressure acting on the control fluid, the time required to move the fluid from chamber 22b through the net orifice area is dependent upon the quantity of fluid involved. After the control fluid is transferred from chamber 22a, no further force can be exerted upon the undersurface of thrust piston 60. Thus, it can be seen that an increase in the height of the fluid column will increase the time duration whereas a decrease in the height of the fluid column will decrease the time duration of the acceleration wave form.

Figure 8 of the drawings illustrates an actuator having means for controlling both the acceleration and deceleration of the thrust piston and associated thrust column as a function of time. This embodiment of the present invention is similar in certain respects to the actuator illustrated in Figure 4, and includes chambers 21 and 22 separated by orifice plate 45, thrust piston 60 and its associated thrust column 25, acceleration metering member 61, and sealing element 65 for providing a pressure seal between piston 60 and wall member 45 and around the opening 28. As shown in Figure 4, the embodiment shown in Figure 8 also includes a load piston 62 which separates chamber 22 into chambers 22a and 22b with chamber 22a arranged to accommodate the control fluid and chamber 22b in which pressure may be established in the form of compressed gas.

Deceleration control of thrust piston 60 and the thrust column, which develops the desired forces on a test specimen or workpiece, is provided by an orifice plate 75 positioned within chamber 21, a deceleration metering member 76 carried with thrust piston 60 and column 25, and control fluid 77 partially filling that portion of chamber 21 between thrust piston 60 and orifice plate 75. Orifice plate 75 includes an opening 78 and is similar in function and operation to acceleration orifice plate 45 and its construction and support within the actuator can be as described hereinbefore in connection with orifice plate 45. However, the size of opening 78 will be dependent upon the desired deceleration characteristics. Deceleration metering member 76 cooperates with orifice 78 and serves to regulate in a predetermined manner the effective flow area of the orifice through which control fluid 77 is forced.

Deceleration control is accomplished by creating a predetermined back pressure in chamber 21 that acts against the top surface of thrust piston 60. This back pressure is developed by the control fluid 77 as it is forced through the restricted opening in orifice plate 75, which is regulated and controlled by the metering member 76. A wide variation in back pressure can be realized for any given velocity of thrust piston 60, and by utilizing a deceleration metering pin 76 having a suitable contour, a predetermined deceleration waveform will be produced as a function of piston position. Although deceleration metering member 76 may be made as an integral part of thrust piston 60 or column 25, member 76 is preferably made as a separate part having a peripheral surface 79 contoured along its longitudinal axis to provide the desired regulating action with respect to orifice 78 and having an internal bore 80 adapted to be fitted around thrust column 25. Since different metering pin contours provide different deceleration waveforms and simply changing metering members will provide a variety of deceleration waveforms from a single actuator, this construction of member 76 will afford a convenient means of changing metering members.

After the actuator has been set in its quiescent condition with thrust piston 60 and orifice plate 45 in sealed relationship and then triggered, as described hereinbefore, and upon completion of the acceleration phase of the actuation cycle as accomplished by the elements common to Figure 4 and described hereinbefore, thrust piston 60 forces the control fluid 77 through the deceleration orifice 78. As the fluid continues to flow through the orifice under the action of the moving thrust piston, the net flow area is selectively varied by the contoured metering member 76. This creates a predetermined back pressure against the piston and provides the desired deceleration characteristics.

With other factors remaining constant, the time after actuation of the unit at which deceleration control is initiated is dependent upon the level of the control fluid with respect to orifice plate 75. For example, if the control fluid in chamber 21 were up to the level of the orifice plate, deceleration control would commence sooner than if the fluid level were only a fraction of the distance between thrust piston 60 and orifice plate 75. Thus, it may be seen that in a given actuator the time of initiation of deceleration control can be selected by adjusting the level of control fluid 77, with respect to the orifice plate 75.

Although a preferred embodiment of an actuator having deceleration control of the thrust piston has been illustrated and described in combination with means for also producing desired acceleration-time patterns, it should be understood that acceleration control of the thrust piston is not indispensable to the function and operation of the deceleration control of the thrust piston. Where desired, an actuator can be constructed utilizing deceleration control alone, just as an actuator can be constructed utilizing acceleration control alone.

Figure 9 illustrates a modification of the triggering mechanism utilized with actuators of the present invention. Whereas in previously described embodiments sealing means were interposed between the thrust piston and wall member, in this embodiment the pressure seal is provided within the opening in the wall member. Referring to the drawing, the triggering mechanism includes thrust piston 81 slidably positioned within chamber 21, a wall member 82 having an opening 83 therein separating chamber 21 and chamber 22, and a sealing member 84 which serves to limit the pressure established in chamber 22 to a portion of the undersurface area of the thrust piston. As described hereinbefore, thrust column 25 is connected with piston 81 and serves to transmit to other apparatus the forces developed by piston 81. Piston 81 carries a packing ring on its peripheral surface to provide a pressure seal between the movable piston and the inner wall of chamber 21 and includes an adapter element 85 which is arranged to fit within the orifice 83 of wall member 82. Adapter 85 may be constructed of any material that can withstand the pressures created within the unit, the shock loads produced, and the frictional forces developed by the high velocity flow of control fluid when acceleration control is provided in the actuator. Adapter 85 may be formed as an integral part of thrust piston 81 or may be constructed as a separate part, or together with a desired metering member, and physically attached to the thrust piston. As shown, sealing member 84 provides a pressure seal between adapter 85 and wall portion 86 within the orifice opening. Seal 84 is preferably of resilient material such as rubber, Teflon or the like. However, in this embodiment effective operation may be realized with a non-resilient type seal, which is arranged to closely contact the wall portion 86 and create the necessary isolation of pressure within chamber 22 to the limited area of thrust piston 81. It will be noticed that orifice plate 82 is generally similar to the orifice plates hereinbefore described. The essential difference being the incorporation of the section formed by wall member 86 to accommodate the adapter and seal.

Triggering operation of the device illustrated in Figure 9 is similar to that hereinbefore described. However, in this embodiment sealing relationship between thrust piston 81 and wall member 82 remains effective until adapter 85 and seal 84 have been displaced from the orifice opening 83. In the embodiments hereinbefore described, sealing relationship between thrust piston and wall member is eliminated with approximately .002 inch displacement of the thrust piston with respect to the wall member, whereas in the present embodiment considerably greater displacement is allowed between thrust piston 81 and wall member 82 before the unit is actuated. It will be apparent that higher amplification factors may be realized in this embodiment than with those hereinbefore described.

Figure 10:
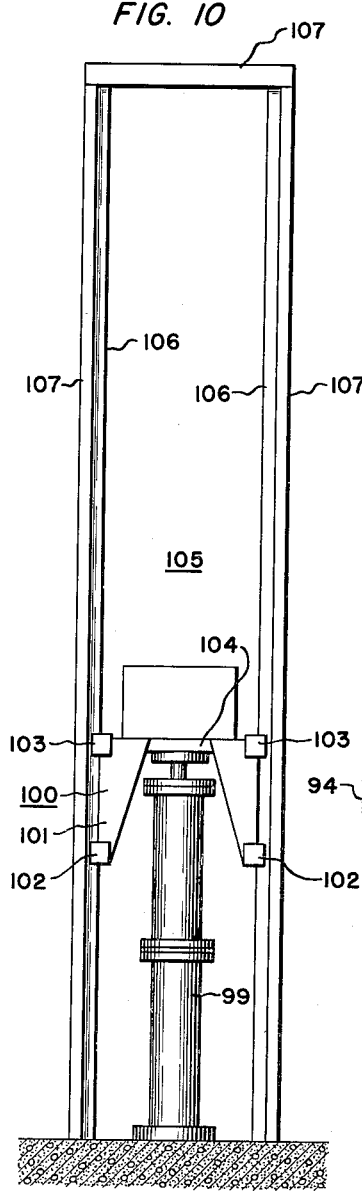
Figure 10 is an elevation view showing an actuator with internal acceleration control as illustrated in Figure 4 and external deceleration control.

Actuators in accordance with the present invention can be used effectively in testing applications where rapidly applied loads are required. In certain applications, high level acceleration forces followed by high level deceleration forces are desired to be applied to a test specimen. An actuator such as described in conjunction with Figure 8 provides a solution to this problem. However, in other applications high level acceleration forces followed by low level deceleration forces are desired. The apparatus illustrated in Figure 10 provides a solution to this problem. As shown by the drawings, the system includes an actuator 99, specimen carriage 100, and rail system 105. Where high level accelerations are required and no special acceleration-time pattern is desired, actuator 99 can be of the type illustrated in Figures 1, 2, and 3. However, where a predetermined acceleration-time pattern is desired and acceleration control of the output thrust is required, actuator 99 may be of the type illustrated in Figures 4 and 8.

Specimen carriage 100 is arranged to rest upon the thrust column of actuator 99 and includes a rigid frame 101 carrying a pair of lower guide members 102 and a pair of upper guide members 103 and a mounting plate 104 fixedly attached to frame 101. Carriage 100 serves to support and carry the specimen being tested and is arranged for slidable movement along rail system 105. Carriage 100 is preferably constructed to maintain its weight at a minimum but still provide the necessary rigidity and minimum mechanical requirements depending upon the loads applied and the weight of the test specimen, and is of such a configuration that it will not be appreciably deflected when subjected to the high central loading produced by actuator 99.

Guides 102 and 103, fixedly mounted on frame 101, are arranged for sliding engagement with rails 106 and serve to maintain the carriage in alignment and maintain lateral play of the carriage with respect to the rails at a minimum. Guide members 102 each includes a friction lining that is in sliding contact with rails 106 and which serves to produce a drag load that opposes the motion of the carriage with respect to the rails. The friction linings may be mechanically adjusted to vary the frictional forces between the carriage and rails and thereby control the deceleration level.

Rail system 105 includes the rails 106 and rail support frame 107. As shown, rails 106 are parallel and are preferably constructed of steel or like material and serve to support and guide the carriage 100. Rails 106 are machined or otherewise made smooth in order to reduce the wear on the guide members and prevent vibration or other spurious movement of the carriage. Rail support frame 107 may also be constructed of steel and is sufficiently rigid and sturdy to provide support to rails 106 and thereby minimize static deflection and vibrations.

In operation, actuator 99 is triggered in a manner hereinbefore described and produces a force which accelerates the carriage and test specimen. The thrust column of actuator 99 is then decelerated at a high rate to stop the acceleration force being applied against carriage 100. Carriage 100 is thereby moved along rail system 105 and is being decelerated due to the action of the friction linings in guide members 102. For purposes of clarification, assume that the weight of carriage 100 and the test specimen is 50 pounds and that a square wave acceleration waveform having an acceleration level of 100 $g$'s and a time duration of 10 milliseconds is developed at the thrust column of actuator 99. Thus, at the conclusion of the acceleration force produced by the actuator, the velocity of the carriage and test specimen will be 386 inches per second and will have been displaced approximately 2 inches. If the drag load produced by guide members 102 is 50 pounds the deceleration level will be 1 $g$, and the carriage and test specimen will travel along the rail system approximately 193 inches. However, if the desired deceleration level is 10 $g$'s corresponding to a drag force of 500 pounds produced by the guide members and rails, the carriage will travel along the rail system 19.3 inches. Thus, it may be seen that controlled acceleration waveforms can be imparted to a workpiece or specimen followed by predetermined deceleration control.

Figure 11:
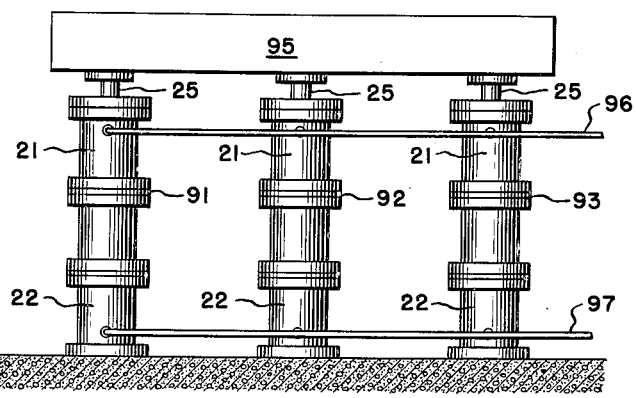
Figure 11 is a view showing a plurality of actuators of the present invention arranged to operate in parallel for producing increased output thrust.

A plurality of actuators of the present invention may be operated in parallel to produce increased output thrust on a test specimen or workpiece. As shown in Figure 11, actuating units 91, 92 and 93 are mounted upon a foundation or supporting structure 94. Actuators 91, 92 and 93 are similar to those hereinbefore described, and thrust columns 25 associated with each unit are attached to a common table or platform 95. Platform 95 is preferably rigid in the plane perpendicular to the application of force delivered by the actuators and has sufficient mass that the downward force exerted on thrust columns 25 by its weight represents a significant portion of the force required on the thrust piston to maintain it in sealed relationship with the wall member when chamber 22 is pressurized to exert a force on the thrust piston slightly below the triggering pressure level. Chambers 21 of each of the actuators are connected to a common source of pressure (not shown) through pressure line 96. Chambers 22 of each of the actuators are also interconnected through a common pressure line 97 to a common pressure source (not shown). Thus, the forces exerted against the thrust pistons of each actuator is substantially the same, and the triggering pressures provided in chambers 22 of each unit are also substantially identical.

Operation of each of the plurality of actuators is similar to that hereinbefore described. With the weight of platform 95 being distributed equally on the actuators and the pressures in chambers 21 and 22 of the units being equal, each unit will be actuated at the same time. The weight of platform 95 serves to insure simultaneous actuation of the plurality of units since actuation of any one unit will produce a removal of that portion of the total force on the other units provided by the weight of platform 95. The removal of this portion of the force required to maintain the thrust pistons and wall members in sealed relationship produces immediate actuation of the remaining units.

It will be apparent that actuators 91, 92 and 93 may be similar to those shown and described in connection with Figure 3, or may include acceleration control as illustrated in Figure 4, deceleration control as described in connection with Figure 8, or may include both acceleration and deceleration control.

While certain preferred embodiments of the invention have been specifically disclosed it is understood that the invention is not limited thereto as many variations will be readily apparent to those skilled in the art and the invention is to be given its broadest possible interpretation within the terms of the following claims.

I claim:

1. An actuator comprising first and second pressure chambers, a wall member having a circular aperture therein disposed between said chambers, a piston slidably positioned within said first chamber and having a surface facing said wall member, an annular resilient seal carried by said surface, said seal being substantially the same size as said aperture and arranged to surround said aperture, means for applying a fluid pressure force on said piston to compress said seal against said wall member and provide a pressure seal around said aperture, means for establishing a fluid pressure in said second chamber, said fluid pressure acting over that area of the piston surface within the annular seal and capable of moving said piston out of sealing relationship with said wall member, and a member connected to said piston for transmitting energy developed by said piston to a workpiece.

2. An actuator comprising first and second pressure chambers, a wall member having an aperture therein disposed between said chambers, a piston slidably positioned within said first chamber and having a surface facing said wall member, a resilient seal carried by said surface, said seal being substantially the same size as said aperture, a pressurized gas in said first chamber for producing a force on said piston to establish said surface in sealing engagement with said wall member, pneumatic means for establishing a pressure in said second chamber, said pressure acting over that portion of the surface within the sealed area and producing a force overbalancing the force establishing the piston and wall member in sealed relationship, and a member connected to said piston for transmitting energy developed by said piston to a workpiece.

3. For use in a thrust producing device including a cylinder, a piston supported within the cylinder arranged for sliding movement, and pneumatic energy for moving the piston to produce useful output thrust on a member attached to the piston, triggering apparatus comprising a wall member having an aperture therein and supported within said cylinder, fluid pressure setting means for applying a force on said piston to cover said aperture and expose only a fraction of the piston surface area, a resilient pressure sealing member around said aperture and interposed between said piston and said wall member, and means for applying said pneumatic energy over that portion of the piston surface exposed by said aperture, said pneumatic energy being capable of producing a force on said exposed piston surface greater than the force produced on said piston by said fluid pressure setting means.

4. An actuator comprising a cylinder having a partition member with an orifice therein and defining first and second chambers, a piston member positioned within said first chamber, means for applying a fluid pressure force to said piston to close said orifice, means interposed between said piston and said partition member to provide a pressure seal therebetween, a pressurized control fluid within said second chamber, said pressurized control fluid exerting a force on said piston to move it out of sealed relationship with said partition member, means for regulating flow of said control fluid into said first chamber to control the forces applied by said control fluid to said piston, and a thrust element coupled with said piston member and arranged to transmit energy developed by said piston member.

5. An actuator comprising first and second chambers with a restricted passage therebetween, a movable piston positioned within said first chamber, a resilient sealing member carried by said piston and arranged to surround said passage, means for applying a first fluid pressure in said first chamber for forcing said piston into sealing relationship with said passage to limit pressure in said second chamber to an area of said piston established by said sealing member, a control fluid in said second chamber, means for applying a second fluid pressure in said second chamber to exert a force on said control fluid to move said piston out of sealing relationship with said passage, a contoured metering member carried by said piston and positioned within said passage to regulate flow of said control fluid through said passage to produce predetermined thrust-time patterns on said piston, and a member connected to said piston for applying said thrust-time patterns to a workpiece.

6. An actuator comprising first and second chambers having a restricted passage therebetween, a movable piston positioned within said first chamber, means for applying a fluid pressure force to said piston to cover said passage, means for providing a pressure seal around said passage, a pressurized control fluid within said second chamber, said pressurized control fluid exerting a force on said piston to move it out of sealed relationship with said restricted passage, a contoured regulating member carried by said piston for regulating control fluid flow into said first chamber to produce predetermined forces on said piston as a function of piston position, and a thrust element coupled with said piston and arranged to transmit energy developed by said piston.

7. An actuator comprising first and second chambers having a restricted passage therebetween, a movable piston positioned within said first chamber, means for applying a first fluid pressure force to said piston to cover said passage, means for providing a pressure seal around said passage, a load member slidably positioned within said second chamber, a control fluid in the space between said load member and said restricted passage, a regulating member carried by said piston and arranged for regulating fluid flow into said first chamber, means for applying a second fluid pressure force on said load member whereby said control fluid exerts a force on said piston to move it out of sealed relationship with said restricted passage and allow regulated fluid flow into said first chamber, and a member connected to said piston for applying said force on said piston to a workpiece.

8. An actuator comprising first and second chambers having a restricted passage therebetween, a movable piston positioned within said first chamber, means for applying a fluid pressure force to said piston to cover said passage, means for providing a pressure seal around said passage, a regulating member carried by said piston and arranged for regulating fluid flow through said passage, a control fluid in said second chamber, a pressurized gas within said second chamber and exerting a force on said piston through said control fluid to move said piston out of sealed relationship with said passage and allow said control fluid to react against an increased piston area, a movable load piston positioned within said second chamber and separating said control fluid and said pressurized gas, said load piston including a member for closing said passage at a predetermined time, and a member connected to said piston for applying said force on said piston to a workpiece.

9. An actuator comprising a first and second chamber with a restricted passage therebetween, a movable thrust piston positioned within said first chamber, means for applying a fluid pressure force to said thrust piston to close said passage, a resilient member carried by said thrust piston and arranged to provide a pressure seal surrounding said passage, a slidable load piston separating said second chamber into a control fluid portion and a pneumatic pressure portion, said load piston including a member arranged to engage and close said passage at a predetermined time, a column of control fluid established in the fluid portion of said second chamber, a contoured metering member carried by said thrust piston and arranged to regulate the flow of control fluid into said first chamber to produce predetermined thrust-time patterns on said thrust piston, a pressurized gas in said pressure portion of said second chamber and applied against said load piston whereby said control fluid exerts a force on said thrust piston to move it out of sealing relationship with passage and allow said control fluid to flow into said first chamber, and a member connected to said thrust piston for applying said force on said thrust piston to a workpiece.

10. An actuator comprising first and second chambers having a first restricted passage therebetween, said first chamber having a second restricted passage therein defining a pressure portion and a fluid portion, a movable piston member positioned within the fluid portion of said first chamber, means for providing a pressure seal around said first passage, means for applying a fluid pressure force to said piston member to cover said first passage and establish it in sealed relationship with said first passage, control fluid established in the fluid portion of said first chamber, a fluid under pressure in said second chamber for exerting a force on an area of said piston member to move out of sealed relationship with said first passage, said piston member carrying a regulating member arranged for movement into said second restricted passage for controlling flow of said control fluid through said passage to create a pressure on said piston member opposed to pressure in said second chamber, and a thrust member connected to said piston member for applying force developed by said piston member to a workpiece.

11. An actuator comprising first and second chambers having a first restricted passage therebetween, said first chamber having a second restricted passage therein defining a pressure portion and a fluid portion, a movable piston member positioned within the fluid portion of said first chamber, means for providing a pressure seal around said first passage, means for applying a fluid pressure force to said piston member to cover said first passage and establish it in sealed relationship with said first passage, a column of control fluid established in the fluid portion of said first chamber and only partially filling said chamber, a fluid under pressure in said second chamber for exerting a force on said piston member to accelerate said piston member out of sealed relationship with said first passage and force said column of control fluid toward said second restricted passage, said piston member having means for regulating flow of control fluid through said second passage to develop predetermined deceleration forces on said piston member, and a thrust member connected to said piston member for applying force developed by said piston member to a workpiece.

12. An actuator comprising first and second chambers having a first restricted passage therebetween, said first chamber having a second restricted passage therein defining a pressure portion and a fluid portion, a movable piston having a top surface and a bottom surface and positioned within the fluid portion of said first chamber, means for providing a pressure seal around said first passage, fluid pressure means for forcing said bottom piston surface into sealed relationship with said first passage, a column of control fluid established in the fluid portion of said first chamber and only partially filling said chamber, a fluid under pressure in said second chamber for exerting a force on said bottom piston surface to accelerate said piston out of sealed relationship with said first passage and force said column of control fluid toward said second restricted passage, said piston carrying means for regulating flow of control fluid through said second restricted passage to develop predetermined deceleration forces on the top surface of said piston, and a thrust member connected to said piston for applying force developed by said piston to a workpiece.

13. An actuator comprising first and second chambers having a first restricted passage therebetween, said first chamber having a second restricted passage therein defining a pressure portion and a fluid portion, a movable piston having a top surface and a bottom surface and positioned within the fluid portion of said first chamber, means for providing a pressure seal around said first passage, fluid pressure means for forcing said bottom piston surface into sealed relationship with said first passage, a column of control fluid in the fluid portion of said first chamber and only partially filling said chamber, a fluid pressure means in said second chamber for exerting a force on said control fluid to accelerate said piston out of sealed relationship with said first passage and force said column of control fluid toward said second restricted passage, a regulating member positioned within said first restricted passage and having a predetermined contour to regulate flow of said control fluid through said first passage to produce predetermined acceleration-time patterns on said bottom surface of said piston, said piston carrying means for regulating flow of said column of control fluid through said second restricted passage to develop predetermined deceleration forces on the top surface of said piston, and a thrust member connected to said piston for applying force developed by said piston to a workpiece.

14. An actuator comprising first and second chambers having a first restricted passage therebetween, said first chamber having a second restricted passage therein defining a pressure portion and a fluid portion, a movable piston having a top surface and a bottom surface and positioned within the fluid portion of said first chamber, means for providing a pressure seal around said first passage, fluid pressure means for forcing said bottom piston surface into sealed relationship with said first passage, a column of control fluid in the fluid portion of said first chamber and only partially filling said chamber, a fluid pressure means in said second chamber for exerting a force on said control fluid to accelerate said piston out of sealed relationship with said first passage and force said column of control fluid toward said second restricted passage, a contoured metering member carried by said bottom surface of said piston and positioned within said first restricted passage to regulate flow of said control fluid through said first restricted passage to produce thrust-time forces on said bottom surface of said piston as a function of piston position, a contoured metering member carried by said top surface of said piston for regulating flow of said column of control fluid through said second restricted orifice to develop predetermined deceleration-time forces on said top surface of said piston, and a member connected to said piston for applying forces developed by said piston to a workpiece.

15. An actuator comprising first and second chambers having a first restricted passage therebetween, said first chamber having a second restricted passage therein defining a pressure portion and a fluid portion, a movable piston having a top surface and a bottom surface and positioned within the fluid portion of said first chamber, means for providing a pressure seal around said first passage, fluid pressure means for forcing said bottom piston surface into sealed relationship with said first passage, a column of control fluid in the fluid portion of said first chamber and only partially filling said chamber, a load member slidably positioned within said second chamber, a control fluid between said load member and said first restricted passage, means for applying a fluid pressure force on said load member whereby a force is exerted on said bottom piston surface to accelerate said piston out of sealed relationship with said first passage and force said column of control fluid toward said second restricted passage, a contoured metering member carried by said bottom surface of said piston and positioned within said first restricted passage to regulate flow of control fluid through said first restricted passage to produce thrust-time forces on said bottom surface of said piston as a function of piston position, a contoured metering member carried by said top surface of said piston for regulating flow of said column of control fluid through said second restricted orifice to develop predetermined deceleration-time forces on said top surface of said piston, and a member connected to said piston for applying forces developed by said piston to a workpiece.

16. An actuator comprising first and second chambers having a first restricted passage therebetween, said first chamber having a second restricted passage therein defining a pressure portion and a fluid portion, a movable piston having a top surface and a bottom surface and positioned within the fluid portion of said first chamber, means for providing a pressure seal around said first passage, fluid pressure means for forcing said bottom piston surface into sealed relationship with said first passage, a column of control fluid in the fluid portion of said first chamber and only partially filling said chamber, a load member slidably positioned within said second chamber, said load member having means arranged to close said first restricted passage at a predetermined time, a control fluid between said load member and said first restricted passage, a gas under pressure applied to said load member whereby a force is exerted by said control fluid on said bottom piston surface to accelerate said piston out of sealed relationship with said first passage and force said column of control fluid toward said second restricted passage, a contoured metering member carried by said bottom surface of said piston and positioned within said first restricted passage to regulate flow of control fluid through said first restricted passage to produce thrust-time forces on said bottom surface of said piston as a function of piston position, a contoured metering member carried by said top surface of said piston for regulating flow of said column of control fluid through said second restricted orifice to develop predetermined deceleration-time forces on said top surface of said piston, and a member connected to said piston for applying forces developed by said piston to a workpiece.

17. In combination with a rail system having a pair of spaced apart rails, a specimen carriage movably mounted on said rails and adapted to support said specimen, and guide members carried by said carriage and slidably engaging said rails, said guide members including friction linings engaging said rails to develop a drag load as said carriage is displaced along said rails; an actuator for applying acceleration forces to said carriage whereby said carriage is displaced along said rail system, said actuator comprising a cylinder having a wall member with an orifice therein, a movable piston member positioned within said cylinder and having an undersurface facing said wall member, means for applying a fluid pressure force on said piston member to cover said orifice and expose a portion of said undersurface, means for effecting a pressure seal between said piston and said wall member, means for applying fluid pressure on the exposed portion of said undersurface to overbalance said force and allow the pressure to act over an increased area of said undersurface, and a thrust element coupled with said piston member and arranged to transmit energy developed by said piston member to said specimen carriage.

18. In combination with a rail system having a pair of spaced apart rails, a specimen carriage movably mounted on said rails and adapted to support said specimen, and guide members carried by said carriage and slidably engaging said rails, said guide members including friction linings engaging said rails to develop a drag load as said carriage is displaced along said rails, an actuator for applying acceleration forces to said carriage whereby said carriage is displaced along said rail system, said actuator comprising first and second chambers with a restricted passage therebetween, a movable piston positioned within said first chamber, a resilient sealing member carried by said piston and arranged to surround said passage, fluid pressure means for forcing said piston into sealing relationship with said passage to limit pressure in said second chamber to an area of said piston established by said sealing member, control fluid established in said second chamber and pressurized to exert a force on said piston to move said piston out of sealing relationship with said passage, a contoured metering member carried by said piston and positioned within said passage to regulate flow of control fluid through said passage to produce predetermined thrust-time patterns on said piston, and a member interconnecting said piston and said specimen carriage for applying said thrust-time patterns to said carriage.

19. Actuating apparatus for producing high level output thrust against a platform comprising a plurality of actuators, each of said actuators having a thrust column arranged to impart forces to said platform and each including first and second pressure chambers having a restricted passage therebetween, a movable piston positioned within said first chamber and connected to said thrust column, a common source of fluid pressure applied to said first chamber of each of said actuators to force said pistons into sealing relationship with said restricted passages, and a common source of fluid pressure applied to said second chamber of each of said actuators to exert a force on said piston to move it out of sealed relationship with said restricted passage and allow pressure to act over an increased area of said piston.

20. Actuating apparatus for producing high level output thrust against a platform comprising a plurality of actuators, each of said actuators having a thrust column arranged to impart forces to said platform and each including first and second pressure chambers having a restricted passage therebetween, a movable piston positioned within said first chamber and connected to said thrust column, a common source of fluid pressure applied to said first chamber of each of said actuators to force said pistons into sealing relationship with said restricted passages, control fluid established in said second chamber, metering means for regulating flow of control fluid through said restricted passage upon activation of said actuator to produce predetermined acceleration-time forces on said piston and a common source of fluid pressure applied to said second chamber of each of said actuators to exert pressure on said control fluid and thereby activate said actuators by moving said pistons out of sealed relationship with said restricted passage.

21. Actuating apparatus for producing high level output thrust against a platform comprising a plurality of actuators, each of said actuators having a thrust column arranged to impart forces to said platform and each including first and second pressure chambers having a restricted passage therebetween, each of said first chambers having a second restricted passage therein defining a pressure portion and a fluid portion, a movable piston positioned within said fluid portion of first chamber and connected to said thrust column, said piston being arranged to be forced into sealing relationship with said restricted passage by pressure applied to said first chamber, a common source of fluid pressure applied to said first chamber of each of said actuators, control fluid established in said fluid portion of said first chamber, metering means in said first chamber and carried by said piston for regulating flow of control fluid through said second restricted passage whereby deceleratoin forces are exerted on said piston, and a common source of fluid pressure applied to said second chamber of each of said actuators to exert a force on said piston to move it out of sealed relationship with said restricted passage whereby said actuator is activated.

22. Actuating apparatus for producing high level output thrust against a platform comprising a plurality of actuators, each of said actuators having a thrust column arranged to impart forces to said platform and each including first and second pressure chambers having a restricted passage therebetween, each of said first chambers having a second restricted passage therein defining a pressure portion and a fluid portion, a movable piston positioned within said fluid portion of first chamber and connected to said thrust column, said piston being arranged to be forced into sealing relationship with said restricted passage by pressure applied to said first chamber, a common source of fluid pressure applied to said first chamber of each of said actuators, control fluid established in said second chamber, metering means for regulating flow of control fluid through said first restricted passage upon activation of said actuator to produce predetermined acceleration-time forces on said piston, control fluid established in said fluid portion of said first chamber, metering means in said first chamber and carried by said piston for regulating flow of control fluid through said second restricted passage whereby deceleration forces are exerted on said piston, and a common source of fluid pressure applied to said second chamber of each of said actuators to exert a force on said piston to move it out of sealed relationship with said restricted passage whereby said actuator is activated.

23. An actuator comprising first and second chambers with a restricted passage therebetween, a movable piston positioned within said first chamber and having an undersurface facing said passage, a sealing member carried by said undersurface and arranged for engagement within said passage, means for providing a pressure seal between said sealing member and an internal wall portion of said restricted passage, means for applying a fluid pressure force to said piston to establish said sealing member in sealing relationship with said passage, and means for exerting fluid pressure to the area of said sealing member exposed by said passage to move said sealing member out of sealing relationship with said passage whereby said fluid pressure is allowed to react over the entire undersurface of said piston.

24. An actuator comprising first and second chambers with a restricted passage therebetween, a movable piston positioned within said first chamber and having an undersurface facing said passage, a sealing member carried by said undersurface and arranged for engagement within said passage, a resilient annular seal carried by said sealing member for providing a pressure seal between said sealing member and an internal wall portion of said restricted passage, means for applying a fluid pressure force to said piston to establish said sealing member in sealing relationship with said passage, and means for everting fluid pressure to the area of said sealing member exposed by said passage to move said sealing member out of sealing relationship with said passage whereby said fluid pressure is allowed to react over the entire undersurface of said piston.

25. An actuator comprising first and second chambers with a cylindrically shaped restricted passage therebetween, a movable piston positioned within said first chamber and having an undersurface facing said passage, a cylindrical sealing member carried by said undersurface and arranged for engagement within said passage, an O ring carried in a groove in said sealing member for providing a pressure seal between said sealing member and an internal wall portion of said restricted passage, means for applying a fluid pressure force to said piston to establish said sealing member in sealing relationship with said passage, and means for exerting fluid pressure to the area of said sealing member exposed by said passage to move said sealing member out of sealing relationship with said passage whereby said fluid pressure is allowed to react over the entire undersurface of said piston.

26. An actuator comprising a cylinder having a wall member with an orifice therein, a movable piston member positioned within said cylinder and having an undersurface facing said wall member, means for applying a fluid pressure force on said piston member to cover said orifice and expose a portion of said undersurface, means for effecting a pressure seal between said portion of said undersurface and said wall member, means for applying fluid pressure on said portion of said undersurface to overbalance said fluid pressure force and allow said fluid pressure to act over an increased area of said undersurface, and a thrust element coupled with said piston member and arranged to transmit energy developed by said piston member.

27. An actuator comprising a cylinder having a partition member with an orifice therein and defining first and second pressure chambers, a movable piston member positioned within said first chamber and having an undersurface facing said partition member, means for applying a fluid pressure force on said piston member to cover said orifice and expose a portion of said undersurface to said second chamber, means for providing a seal between said portion of said undersurface and said partition member, means for establishing in said second chamber a fluid pressure acting on the exposed portion of said undersurface to overbalance said fluid pressure force and allow said fluid pressure to act over an increased area of said undersurface, and a thrust element coupled to said piston member and arranged to transmit energy developed by said piston member.

28. An actuator comprising a cylinder having a wall member with an orifice therein, a movable piston member positioned within said cylinder and having an undersurface facing said wall member, means for applying a fluid pressure force on said piston member to cover said orifice and expose a portion of said undersurface, a resilient sealing element positioned between said portion of said undersurface and said wall member for effecting a pressure seal therebetween, means for applying fluid pressure on said portion of said undersurface to overbalance said force and allow said fluid pressure to act over an increased area of said undersurface to develop an increased force against said undersurface of said piston member, and a thrust element coupled to said piston member and arranged to transmit energy developed by said piston member.

29. An actuator comprising a cylinder having a wall member with an orifice therein, a movable piston member positioned within said cylinder and having an undersurface facing said wall member and arranged to cover said orifice, and expose a portion of said undersurface, a resilient seal carried by said piston member and positioned between said portion of said undersurface and said wall member, means for applying a fluid pressure force on said piston member to establish said portion of said undersurface in sealing relationship with said wall member, a source of fluid pressure acting on said portion of said undersurface to overbalance said fluid pressure force and allow said fluid pressure to act over an increased area of said undersurface and thereby develop an increased force against said undersurface of said piston member and a thrust element coupled to said piston member and adapted to transmit energy developed by said piston member.

References Cited in the file of this patent

UNITED STATES PATENTS

| | | | |
|---|---|---|---|
| 635,149 | Schreidt | Oct. 17, | 1899 |
| 1,799,366 | Heinkel | Apr. 7, | 1931 |
| 2,133,170 | Johnson | Oct. 11, | 1938 |
| 2,452,292 | Cousino | Oct. 26, | 1948 |
| 2,474,235 | Dresser et al. | June 28, | 1949 |
| 2,522,307 | Shaff | Sept. 12, | 1950 |
| 2,537,096 | Shreeve et al. | Jan. 9, | 1951 |
| 2,604,777 | Armstrong et al. | July 29, | 1952 |
| 2,687,522 | Juilfs | Aug. 31, | 1954 |
| 2,719,510 | Elder | Oct. 4, | 1955 |
| 2,740,859 | Beatty et al. | Apr. 3, | 1956 |
| 2,810,288 | Herron et al. | Oct. 22, | 1957 |
| 2,854,953 | Osborne | Oct. 7, | 1958 |

FOREIGN PATENTS

| | | | |
|---|---|---|---|
| 833,581 | France | July 25, | 1938 |